No. 772,404. PATENTED OCT. 18, 1904.
M. CORRINGTON.
FLUID PRESSURE BRAKE APPARATUS.
APPLICATION FILED AUG. 11, 1904.
NO MODEL. 2 SHEETS—SHEET 1.

Witnesses:
Max B. A. Doring.
M. M. Evans.

Inventor:
Murray Corrington

No. 772,404. PATENTED OCT. 18, 1904.
M. CORRINGTON.
FLUID PRESSURE BRAKE APPARATUS.
APPLICATION FILED AUG. 11, 1904.
NO MODEL. 2 SHEETS—SHEET 2.
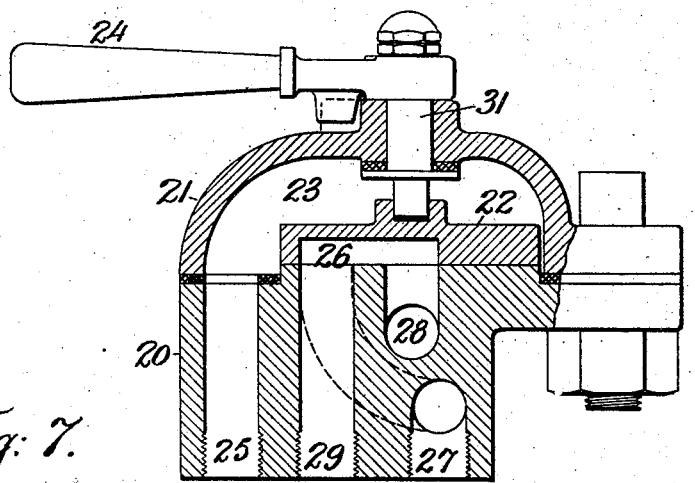
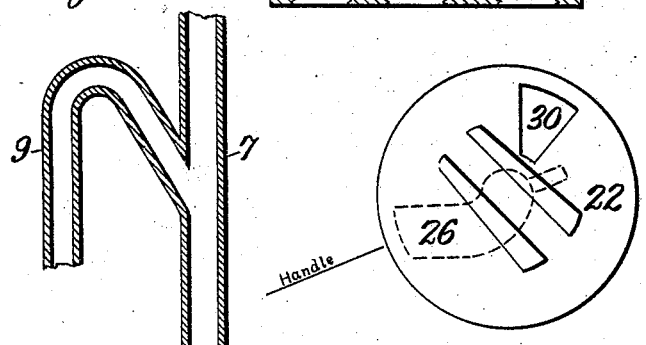
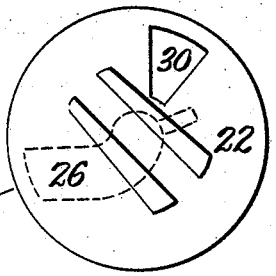
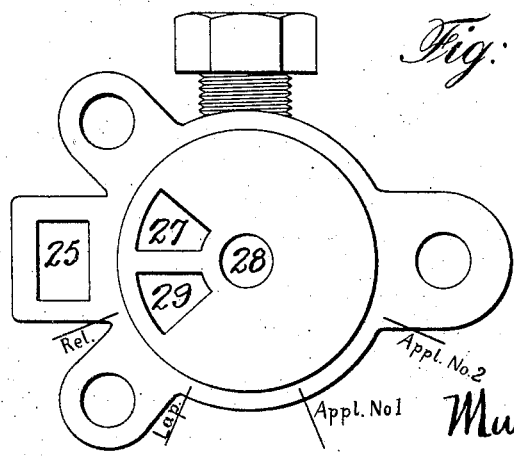
Witnesses:
Max B. A. Doring.
M. M. Evans.
Inventor:
Murray Corrington No. 772,404. Patented October 18, 1904.

UNITED STATES PATENT OFFICE.

MURRAY CORRINGTON, OF NEW YORK, N. Y.

FLUID-PRESSURE BRAKE APPARATUS.

SPECIFICATION forming part of Letters Patent No. 772,404, dated October 18, 1904.

Application filed August 11, 1904. Serial No. 220,342. (No model.)

*To all whom it may concern:*

Be it known that I, MURRAY CORRINGTON, a citizen of the United States, residing at New York city, in the county and State of New York, have invented certain new and useful Improvements in Fluid-Pressure Brake Apparatus, of which the following is a specification.

My invention relates to a system of fluid-pressure brakes in which what is known as the "automatic" brake system, operated by means of a triple valve on each vehicle, which admits air to the brake-cylinder through a reduction of train-pipe pressure, and what is known as the "straight-air" system, which admits pressure direct from any source of supply to the brake-cylinder, are combined for mutual operation.

Figure 1:
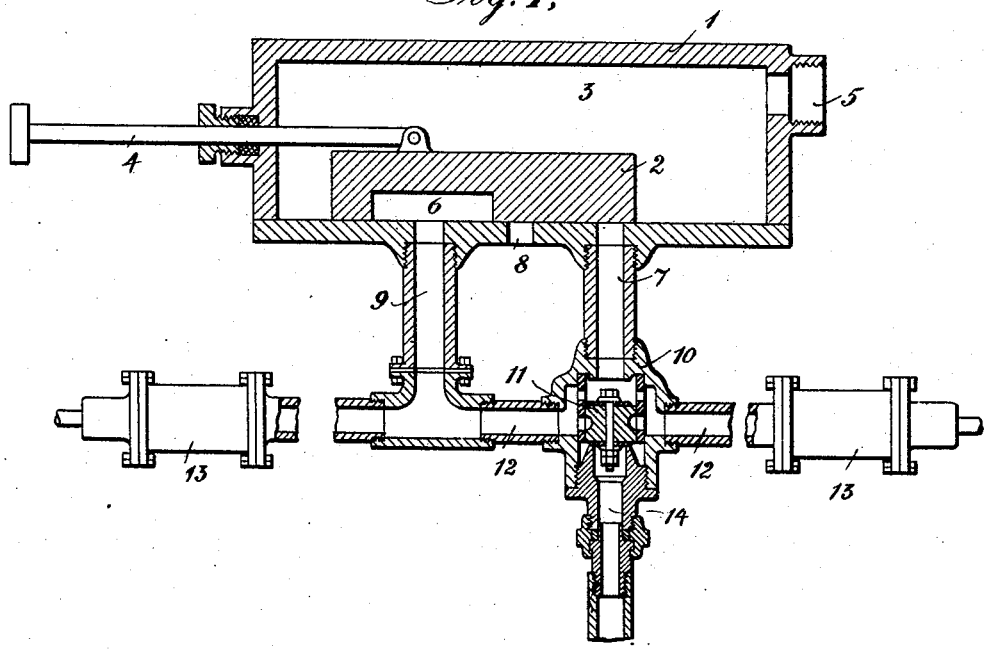
Figure 2:
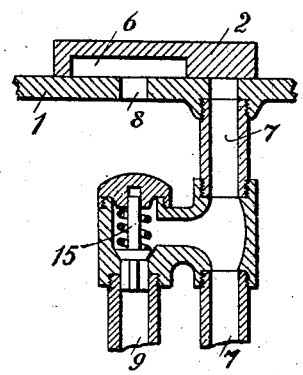
Figure 3:
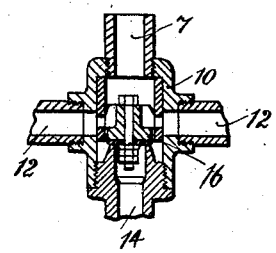

Figure 1 represents a vertical section through a form of valve device illustrating my apparatus. Figs. 2, 3, and 7 represent modifications of detail parts. Fig. 4 is a vertical section of another device with rotary form of valve embodying my invention; and Figs. 5 and 6 are plan or top views of the rotary-valve seat and valve, respectively.

Fig. 1 embraces a valve-casing 1, which incloses a valve 2, operating within a chamber 3, having a handle or stem 4 projecting through the casing for operation of the valve 2. A port 5, leading into the chamber 3, is to be connected with a source of pressure-supply, such as the air-pump or main reservoir of the brake system. The chamber 3 will therefore normally contain pressure equivalent to that in the main reservoir or a reduced pressure, according to the requirements of the service. The valve 2 has a cavity 6 and controls ports or passages 7, 8, and 9. The port or passage 7 leads into a casing 10, in which operates what is known as a "double" check-valve 11, capable of seating in both directions. From the casing 10 one or more passages 12 lead to one or more brake-cylinders 13. A pipe or passage 14 also leads into the casing 10, and the opposite end of such passage 14 is to be connected to the service-port of the triple valve of the automatic system.

When the cylinders 13 are to be filled with pressure from the automatic system, the apparatus constituting that system, which is not illustrated herein, since it is so thoroughly understood by all persons skilled in the air-brake art, is operated in the usual manner, shifting the triple valve to the position for setting brakes when air flowing from the auxiliary reservoir through the triple valve goes by way of the passage 14, lifts the double check-valve 11 against its upper seat, closing the passage 7, and flows through the pipes 12 to the brake-cylinders. The pressure against the under side of the double valve 11 will hold it against its upper seat, so that pressure may be admitted or exhausted at will to and from the cylinders through the passages 14 and 12 by shifting the triple valve to application and release positions. The valve 2 in the position illustrated prevents any escape of pressure through passage 9.

When the brakes are to be operated by the straight-air system, the valve 2 is drawn to the left, opening passage 7, whereupon the pressure from chamber 3 flows through said passage, moves the valve 11 against its lower seat, thus closing passage 14, and thence flows through the passage 12 to the cylinders. This is application position of the valve. By moving the valve 2 back to the position illustrated, which is "lap" position, all ports 7, 8, and 9 are closed. If it is desired to reduce the pressure in the cylinders at any time, whether that pressure has been admitted through the passage 14 by operating the automatic system or through the passage 7 by operating the straight-air system, it is only necessary to move the valve 2 to the right or release position and connect ports 8 and 9, whereupon the pressure is vented from the cylinders to the atmosphere. It is apparent that by shifting the valve 2 between the positions "application," "lap," and "release," the pressure in the cylinders may at all times be varied at will.

In case the automatic system is operated so that the double valve 11 is against its upper seat, with a moderate pressure admitted to the cylinders, and it is desired to increase the cylinder-pressure independently of moving the valve 11 away from this position, the valve 2 may be moved far enough to the right to open the port 9, thus admitting more pressure to the cylinders. Pressure may also be admitted to the cylinders through 9 without operating the automatic system, provided the valve is on its lower seat.

Fig. 2 represents a modification in which the passage 9 leads into the passage 7 and has a check-valve 15 seating downward. The valve 2, with cavity 6, in this arrangement controls only the two ports 7 and 8. When pressure is admitted through passage 7, it cannot reach the brake-cylinders through passage 9, which insures the downward seating of the double valve 11, so as to prevent the flow of air through the passage 14 to the triple exhaust-port. When it is desired to produce the same results as above described by exhausting the pressure through passage 9, supposing the double valve 11 to be on its upper seat and the passage 7 closed, and the triple to be in position to apply brakes, this result can be accomplished by moving the valve 2 to connect ports 7 and 8, thus venting the pressure through 9 into 7, past the valve 15, and by port 8 to the atmosphere. It is to be understood that pressure is always present above valve 2 and that passages 7 and 9 are to be connected to the other parts, as in Fig. 1.

Fig. 7 is substantially like Fig. 2, except that the check-valve 15 is omitted. When pressure is admitted through passage 7, it flows across the end of passage 9 and creates a suction through the latter toward 7, thus causing the check-valve 11 to be moved to its lower seat if the triple is in "release." If, however, the triple valve is in application position and passage 7 is closed by the check-valve 11, pressure can be admitted and released to and from the cylinders through passage 9.

Fig. 3 represents another modification in which the double check-valve 11 is replaced by a single operating check-valve 16. The passages leading into the valve-case 10 and the valve 2 are intended to be the same as in Fig. 1 essentially. The valve 16 will when seated over the passage 14 close the same; but it will never close the passage 7, being so constructed as to permit the pressure to be exhausted through said passage, so that pressure may be admitted or released at all times through the passages 7 and 12 and to and from the cylinders. It must be apparent that with passage 7 of Figs. 3 and 1 and the port 8 controlled by the valve 2 any air admitted into passage 7 will not be released until the valve 2 is moved to the proper position.

In Figs. 4, 5, and 6 the form of mechanism is somewhat changed, though the principles of construction are essentially the same, the main difference being a rotary form of valve instead of a valve reciprocating in a straight line. For assistance in identifying the corresponding parts I have, so far as practicable, added 20 to the reference-numerals employed in the preceding figures. The rotary valve 22 operates on a seat formed on the casing 20 and is inclosed by the cap 21. The handle 24 is attached to a shaft 31, extending through the cap, and on its lower end is a piece suitably adapted to fit a mortise or slot on the top of the valve 22—a usual construction for operating rotary valves. Passage 25 is connected with the source of pressure-supply, which is always present in the chamber 23 above the valve 22. Passages 27 and 29 are to be connected with the brake-cylinders and check-valve casing similarly to the passages 7 and 9 in the other figures. Passage 28 leads out to exhaust in any convenient way. The valve 22 has a cavity 26 on its under surface and a port 30 through it.

Moving the valve of Fig. 6 downward and placing it in position upon the valve-seat, Fig. 5, with the line marked "handle" falling over the line marked "Rel.," or "release," the cavity 26 connects passages 29 and 28, exhausting pressure from the brake-cylinders just the same as when cavity 6 connects ports 8 and 9 in Fig. 1. If the valve is turned so that the handle falls in position marked "Lap," which would ordinarily be the normal position of the valve, all ports are closed. If the valve is turned farther, so that the handle falls in application position No. 1, the port 30 stands over 27, thus admitting pressure through that passage and the valve-case 10 to the brake-cylinders, producing the same results as already described in reference to the other figures. If the valve 11, as in Fig. 1, is on its upper seat, having been moved there either by admitting pressure through the passage 14 in operating the automatic system or otherwise and it is not desired to move it away from the seat, a quick movement of the valve 22 to application position No. 2 will cause the port 30 to stand over and admit pressure through the passage 29, which produces the same effect as described with reference to Fig. 1, when pressure is admitted through passage 9. In effecting this movement of the valve to the second application position some pressure may be admitted into passage 27 as the port 30 crosses it, or some pressure may leak past the valve into the port 27 and thence against the upper end of the check-valve, tending to move it away from its seat. This tendency may be overcome by making a small projection or cavity from the main cavity 26, which will stand over port 27 while the valve is in the second application position, so as to keep the passage leading to the upper side of the casing 10 free from pressure and the valve 11 on its upper seat. Good results may also be obtained by connecting the passage 29 to the check-case 10 and the passage 27 directly to the cylinder. In such event it may be necessary before admitting pressure through 27 to shift the valve 22, so that port 30 stands for a moment over 29 to insure the seating of the check-valve over the passage 14.

For convenience of illustration I have shown the casing 10 in such relationship to the other parts that the inclosed check-valve operates vertically. As a matter of fact it would perhaps be preferable in practice to turn this casing on its side, so that the valve will operate horizontally.

I claim—

1. In a combined automatic and straight-air brake system, the combination of passages from both brake systems to a brake-cylinder, a check-valve device controlling the same, a valve controlling the straight-air passage and means controlled by said valve for admitting and releasing pressure to and from said cylinder independently of the position of said check-valve device.

2. In a combined automatic and straight-air brake system, the combination of passages from both brake systems to a brake-cylinder, a check-valve device controlling the same, a valve capable of occupying three several positions and means controlled by said valve for varying and retaining any desired pressure in said cylinder independently of the position of said check-valve device.

3. In a combined automatic and straight-air brake system, the combination of passages from both brake systems to a brake-cylinder, a check-valve device for closing the automatic passage which is actuated by pressure admitted through the straight-air passage, a valve for controlling the straight-air passage and means controlled by said valve for releasing pressure from said cylinder independently of the position of said check-valve device.

4. In a fluid-pressure brake system, the combination of automatic mechanism on a car and automatic mechanism on an engine operating to apply brakes by a reduction of pressure in a train-pipe, a straight-air passage and an automatic passage leading to the engine brake-cylinder, a check-valve device for controlling the same, and means under control of the engineer for alternately holding brakes applied on the car while releasing on the engine, and vice versa.

MURRAY CORRINGTON.

Witnesses:
CHARLES F. GEHRMANN,
M. M. EVANS.